United States Patent Office 3,297,412
Patented Jan. 10, 1967

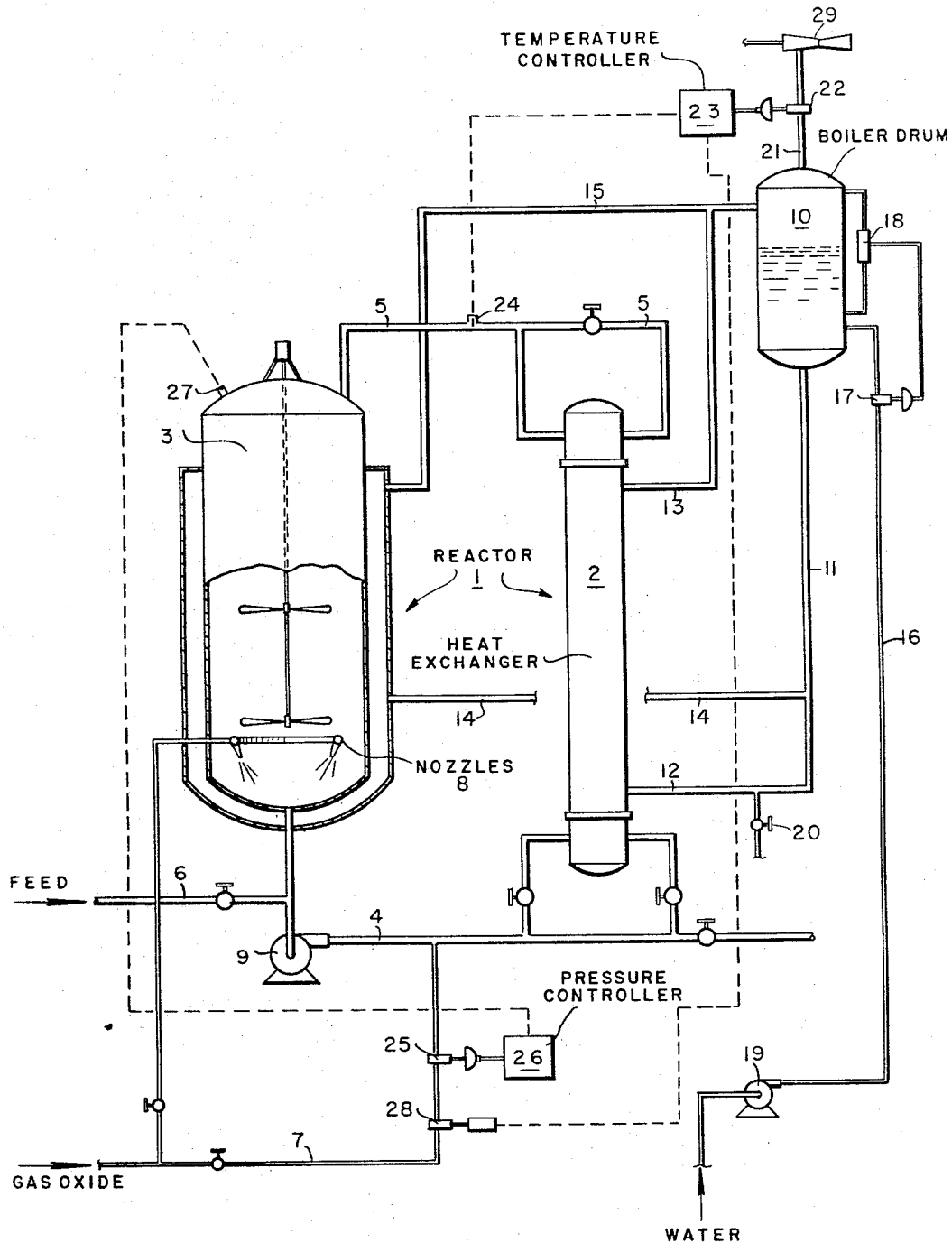

3,297,412
APPARATUS FOR CONDUCTING EXOTHERMIC
REACTIONS
Cecil Phillips, Jr., Baytown, and Roy D. Stanphill, Pasadena, Tex., assignors to Esso Research and Engineering Company, a corporation of Delaware
Original application Dec. 11, 1963, Ser. No. 329,817. Divided and this application Oct. 18, 1965, Ser. No. 497,015
3 Claims. (Cl. 23—285)

This application is a division of Serial No. 329,817, filed December 11, 1963, entitled "Method and Apparatus for Conducting Exothermic Reactions."

The present invention is directed to a method and apparatus for conducting exothermic reactions. More specifically, the invention is concerned with the highly exothermic oxyalkylation reactions. In its more specific aspects, the invention is directed to a method and apparatus for improved control of temperature in conducting exothermic reactions, such as oxyalkylation reactions, by removing the heat of reaction through indirect heat exchange with a boiling fluid.

The present invention may be briefly described as a method and apparatus for conducting exothermic reactions, such as an oxyalkylation reaction, in a reactor wherein the temperature of the reaction mixture is maintained substantially constant and the heat of reaction removed by automatically regulating the vapor pressure of a boiling fluid which is in indirect heat exchange with the reaction mixture.

In many processes involving catalyzed reactions in which substantial quantities of heat are involved, the temperature and pressure conditions which must be employed for producing optimum results in yields of the desired products are critical within very close limits; and, it is therefore desirable to maintain a substantially uniform temperature throughout the reaction zone in order to eliminate zones of high temperature wherein excessive reaction will occur as well as to eliminate zones of low temperature wherein the reaction will stop or the reaction rates will be substantially reduced. In accordance with the present invention, improved control of reaction temperature is accomplished by automatically regulating the vapor pressure maintained on the boiling fluid which is in indirect heat exchange with the reaction mixture which in turn regulates the boiling temperature of the fluid used as the cooling medium. The improved temperature control of the reaction mixture stems from the more uniform mean temperature difference maintained across the heat exchange surface when utilizing a boiling fluid as the cooling medium. Further, improved flexibility in heat transfer capacity likewise results from a boiling fluid being used as the heat exchange fluid in that the heat absorbed by the cooling medium when converted to latent heat of vaporization of the vapor of the cooling medium produces changes in vapor pressure, which is automatically controlled in response to the temperature of the reaction mixture.

In conducting oxyalkylation reactions an olefin oxide, such as ethylene oxide or propylene oxide, is added at a controlled rate to an acceptor material containing a labile hydrogen atom. Examples of acceptor materials are alcohols, amines, fatty acids, phenols, glycols, etc. Oxyalkylation reactions are usually conducted in the presence of a catalyst and at elevated temperature and pressure. The catalyst may be sodium hydroxide, sodium methylate, or other alkaline catalysts. The temperature and pressure conditions for oxyalkylation reactions are within the range of about 0 to about 100 p.s.i. and about 250° to about 400° F. Under such conditions the olefin oxide molecules add to the aceptor materials to form linear polyglycol ether type reaction products. The oxyalkylation reaction per se is known and is not a part of the present invention. The olefin oxide addition reactions are strongly exothermic. For example, ethylene oxide on reaction produces approximately 860 B.t.u.'s per pound of the oxide reacted. Since the reaction rate increases exponentially with temperature, the reaction mixture is subject to temperature runaway if excess olefin oxide is available for reaction, and adequate heat removal facilities are not provided to remove exothermic heat of reaction and control of the reaction mixture temperature.

In order to achieve commercially practical reaction rates in an oxylalkylation reaction, it is necessary to maintain the reaction mixture at some minimum elevated temperature. For example, in most ethylene oxide additions it is necessary to maintain a minimum reaction mixture temperature of about 250° F. or higher. At lower temperatures, the reaction rates are very slow and may be stopped at even lower temperatures. In conducting oxyalkylation reactions, it is necessary to avoid addition of the olefin oxides at a rate greater than the reaction rate since this would result in the accumulation of excess unreacted olefin oxide in the reaction mixture. Under such conditions any increase in the temperature can result in uncontrolled reaction of the excess olefin oxide accompanied by rapid liberation of the heat of reaction and a temperature runaway. Because of the highly exothermic nature of oxyalkylation reactions and the difficulty in controlling the reaction mixture temperature, oxyalkylation reactions conducted by conventional methods and apparatus are inherently hazardous. This is particularly so because olefin oxides are thermodynamically unstable and will explode spontaneously if heated to sufficiently high temperatures.

In conventional methods for conducting oxyalkylation reactions, it is the usual practice to provide a recirculation or once-through cooling water type of heat exchange for heat removal. In such a conventional method and apparatus, it is difficult to control both the temperature of the reaction mixture and the oxide addition rate simultaneously to prevent low temperature conditions at which excess oxide addition may occur or to prevent high temperature conditions which may adversely affect product quality. Generally, oxyalkylation reactions are of the batch type and are initiated with a relatively small volume of acceptor material. The volume of the reaction mixture increases in some cases as much as 20-fold by the addition of olefin oxide to the acceptor material. This continuous change in volume of the reaction mixture during the batch process adds to the difficulty of temperature control when cooling is by the conventional methods and apparatus.

Furthermore, temperature variations during the oxyalkylation reaction result in a reduction in product quality. The wide temperature variations during oxyalkylation reactions are considered to result in increased molecular weight distribution of the product and aldehyde radical formation which alters the molecular structure and properties of the reaction product and promotes self-polymerization of olefin oxide. Thus, it has been found that the oxyalkylation of an acceptor material under the conditions of the present invention will produce a superior product.

The object of the present invention is to provide a method and apparatus for conducting exothermic reactions with improved control of the reaction mixture temperature. A further object is to utilize the maximum available heat exchange area by using a tube and shell heat exchanger as part of the reactor and a boiling fluid as the heat exchange fluid. Still a further object of the present invention is to provide a method and apparatus for conducting oxyalkylation reactions with improved control of reaction mixture temperature and olefin oxide feed rate such that the disadvantages previously described for conventional methods are essentially eliminated. Further, it is an object to produce an oxyalkylation reaction product which is superior to those previously produced. Still further, it is the object of the present invention to utilize a boiling fluid as the heat exchange fluid and to automatically regulate the vapor pressure thereof, and accordingly the temperature thereof, in response to the temperature of the reaction mixture. Other objects and advantages will be apparent in the description which follows.

To illustrate the method and apparatus of the present invention, reference is made to the attached drawing showing one specific arrangement of the equipment by which the advantages previously described might be accomplished. It is to be understood that various other arrangements may be used; and accordingly, it is not intended to limit the present invention to the particular arrangement of apparatus but that the invention should be considered as being illustrated by this preferred mode.

The exothermic reaction is conducted in a reactor 1. The reactor 1 preferably consists of a tube and shell heat exchanger 2 and a reactor vessel 3 connected in series by lines 4 and 5. The combination of the tube and shell heat exchanger and reactor vessel to make up the reactor 1 is preferred so as to maximize the available heat exchange area.

In carrying out the oxyalkylation reaction, liquid acceptor material is introduced by line 6 into the bottom of the reactor vessel 3. Sufficient acceptor material is introduced to carry out a complete batch operation requiring only that volume of acceptor material to fill the tube and shell heat exchanger 2 and lines 4 and 5 so that the acceptor material may be circulated. The gaseous oxide is introduced into line 4 by line 7 or at the bottom of the reactor vessel 3 through nozzles 8. The gaseous oxide is introduced at these points so that the initiation of the oxyalkylation reaction occurs just prior to the introduction of the reaction mixture into tube and shell heat exchanger 2 having the maximum heat exchange area. Pump 9 circulates the material from the bottom of the reactor vessel 3 through line 4 to the heat exchanger 2 and back through line 5 to the reactor vessel 3.

The reactor 1 is provided in indirect heat exchange with a boiling fluid which is preferably water as the heat exchange fluid. Water is a constant boiling fluid at any fixed pressure, and the boiling point temperature may be changed by changes in pressure. Other constant boiling fluids, i.e., constant boiling point at a fixed pressure, may be used such as certain paraffinic hydrocarbons containing 2 to 15 carbon atoms, Dowtherm A, a eutectic mixture of 73.5% diphenyl oxide (ether) and 26.5% diphenyl and other known constant boiling heat exchange fluids. Both heat exchanger 2 and reactor vessel 3 have shells through which the heat exchange fluid is circulated. The boiling fluid such as water is circulated from a boiler drum 10 through line 11 into the shell side of heat exchanger 2 by line 12 and back to the boiler drum 10 by line 13. The heat exchange fluid is circulated from line 11 by line 14 to the shell side of the reactor vessel 3 and is returned to boiler drum 10 by line 15. The liquid level in the boiler drum 10 is maintained at some level higher than the physical elevation of the heat exchanger 2 and the reactor vessel 3 by introducing water through line 16 which is controlled by an automatic control valve 17 actuated by a level control instrument 18 which in turn regulates the flow of boiler drum makeup water by controlling water pump 19. The shells of heat exchanger 2 and reaction vessel 3 are thus filled with water which provides the safety feature that considerable heat exchange capacity is available if the supply of water or heat exchange fluid should be cut off.

The oxyalkylation reaction is carried out in a batch operation by first introducing the acceptor material by line 6 to the reactor vessel 3. In order to raise the temperature of the acceptor material to a level at which the oxyalkylation reaction can be initiated, steam is introduced through line 20 into both the shell side of heat exchanger 2 and reactor vessel 3. The steam is vented through return lines 13 and 15 into boiler drum 10 and to the atmosphere through vent line 21. When the reactor and the acceptor material have reached a desired reaction temperature, for example 250° to 400° F. depending upon the specific acceptor material, the shell of the reactor vessel and tube and shell heat exchanger are filled with hot water at the desired reaction temperature from boiler drum 10.

The temperature of the boiling fluid or heat exchange fluid is maintained within a range which approaches the desired temperature for the reaction mixture. When water is used under atmospheric pressure or above, the temperature of the heat exchange fluid is maintained within a range of about 212° F. and the reaction mixture temperature. The vapor pressure of the boiling fluid, or more specifically the pressure maintained on the boiler drum 10, is controlled; and accordingly, the temperature of the boiling fluid is regulated. The pressure is controlled by means of an automatic valve 22 in the vent line 21 of the boiler drum. The automatic valve 22 is operatively connected to temperature controller 23 which is a conventional temperature control device which pneumatically regulates a valve in response to a measured temperature when compared with a desired selected temperature. The temperature of the reaction mixture is measured by a bulb-type temperature sensing device or a thermocouple 24 in line 5 connecting the tube and shell heat exchanger 2 and the reaction vessel 3. The temperature sensing device is operatively connected to and a part of temperature controller 23. Thus, through the temperature controller 23 the vapor pressure of the boiling fluid is controlled between limits in response to the temperature of the reaction mixture such that the reaction mixture is maintained at a substantially constant temperature.

The use of a boiling fluid is automatically responsive to the buildup of heat in the reaction mixture and effectively dissipates and controls the temperature rises preventing temperature runaway. Further, the control of the heat exchange fluid is in response to the reaction mixture temperature as controlled through temperature controller 23 which prevents the reaction mixture from being cooled to a point below its initiation temperature. As pointed out herebefore, such cooling of the reaction mixture is highly dangerous in that the reaction in fact will stop when below the initiation temperature and the gaseous olefin oxide will then accumulate. If the temperature is thereafter raised, the accumulated olefin will immediately react. Thus, the use of the temperature controller is twofold and responds automatically to maintain the temperature of the reaction mixture essentially constant.

The oxyalkylation reaction is carried out such that when the desired initiation temperature is reached and the apparatus has been heated to that temperature, the oxyalkylation reaction is started by adding an olefin oxide, such as ethylene oxide or propylene oxide, to the circulating acceptor material through line 7 or through the nozzles 8. The introduction of the olefin oxide may be at a constant rate through valve 25 with reaction pressure varying, or valve 25 is controlled automatically in response to the pressure in the reactor 1 by pressure controller 26 and pressure sensor 27. As a further safety feature, temperature controller 23 is operatively connected to a safety solenoid valve 28 which shuts off the supply of olefin oxide if the temperature of the reaction mixture reaches an unsafe upper limit.

The flexibility of the boiling fluid or heat exchange fluid system may be increased by using a steam ejector evacuation system 29 connected to vent line 21, thus permiting the boiling of the heat exchange fluid at pressures below atmospheric.

The constant supply of heat exchange fluid or water to the shell of the line heat exchanger 2 and reactor vessel 3 is accomplished by a thermal siphon effect. Thus, when steam is generated in the shells of the heat exchanger 2 and the reactor vessel 3, the average density of the steam-water mixture in the shells is much less than the density of the water in the boiler drum 10 and water line 11. Therefore, the difference in density provides a pressure differential causing the boiler water to flow into the bottom of the shells of the heat exchangers through lines 12 and 14. The steam generated disengages from the steam-water mixture in the vapor space of boiler drum 10 and is vented to the atmosphere through line 21 by regulation of the control valve 22. The steam is discharged at a regulated pressure responsive to the temperature of the reaction mixture whereby the temperature of the heat exchange fluid may be varied and closely controlled. Thus, the mean temperature difference between the circulating reaction mixture and the heat exchange fluid is maintained as small as possible. The importance of maintaining the reaction mixture temperature in an oxyalkylation process essentially constant can be understood by considering the temperature profile across the reaction mixture, heat exchange surface and heat exchange fluid in the usual process. In most conventional oxyalkylation processes, the heat exchange fluid is water or other material which is passed in contact with the heat exchange surface on a once-through basis or recirculated at a temperature of near ambient to about 130° F. to provide the necessary heat exchange capacity for the exothermic reaction. Thus, while the conventional heat exchange fluid may maintain the over-all reaction mixture within reasonable temperature limits, it has been found that the temperature within the reaction mixture is not uniform. Near the wall of the heat exchange surface a film of reaction material will be cooled to a temperature below the reaction initiation temperature to an extent no reaction occurs in the film of material due to the necessary temperature differential required between the reaction mixture and the conventional heat exchange fluid. Furthermore, in the conventional process there exists the possibility of cooling the entire reaction mixture to a temperature below the reaction initiation temperature if the feed rate of olefin oxide is for any reason below the heat transfer capabilities of the system. Once any part of the reaction mixture is cooled below the initiation temperature and thereafter the reaction mixture heated above the initiation temperature, this has the undersirable effect of producing a product of inferior quality. The reaction will not only be between the olefin oxide or oxides and the initiator material but also may be between the olefin oxides themselves. Thus, an inferior product is produced by conventional processes since a portion of the reaction mixture is always below the reaction initiation temperature. In the event a portion or the entire reaction mixture is cooled below the reaction initiation temperature with continued addition of the olefin oxide, further reaction of the reaction mixture upon heating will cause a heat surge to result, thus making control of the temperature of the reaction mixture most difficult as well as the possibility of temperature runaway. Again, an inferior product will result. Conventional systems have no safety features to control the cooling of the reaction mixture below the initiation temperature during the reaction.

On the other hand, according to the present invention, the use of a boiling fluid as the heat exchange fluid allows the temperature profile to be such that while the heat exchange fluid has the capability of transferring the heat as the temperature of the reaction mixture increases, the reaction mixture on the other hand is not cooled to a point below its initiation temperature. By controlling the pressure of the boiling fluid and hence its temperature, the heat produced in the exothermic reaction is removed while maintaining a minimum reaction temperature automatically. According to the present invention, the temperature of the boiling fluid or heat exchange fluid is thus maintained within a range that is substantially nearer to the desired reaction mixture temperature than known processes. In comparison with conventional processes, the present invention utilizes a substantially smaller temperature differential between the reaction mixture and the heat transfer fluid to maintain control of the temperature of the reaction mixture.

The present invention will be further illustrated by the following example.

A polyethylene glycol was produced by charging ethylene glycol to the reactor consisting of a shell and tube heat exchanger and a reactor vessel. The ethylene glycol was heated to above the initiation temperature (about 275° F.) while purging the system with natural gas to remove all oxygen. The system was vented prior to introduction of ethylene oxide, and the temperature of the ethylene glycol was about 312° F. The selected temperature control temperature was 325° F. and was achieved within 8 to 10 minutes. The selected temperature was maintained within 1 to 2° F. throughout the about 4½-hour ethylene oxide feed period. During this period, the ethylene oxide was introduced at increasing fixed feed rates from 1.5 g.p.m. (gallons/min.) to 6.0 g.p.m. while the pressure increased from about 0 to about 70 p.s.i.g. An excellent product was produced.

The same control of the reaction mixture temperature may be achieved with other acceptor materials and olefin oxides over a wide range of oxide feed rates. The temperature control is within 5° F. and usually the 1 to 2° F. exemplified in the above example.

The quality of oxyalkylation materials produced, according to the present invention, was determined by producing duplicate polyglycol ethers made by polymerization of ethylene oxide and propylene oxide at the same conditions except for reactor mixture temperature control in the production of the ethers as demulsifier intermediates. A polyglycol ether polymerization product made with a reaction mixture temperature range which varied alternately from 250° to 350° F. throughout the reaction procedure by using a conventional cold water heat exchanger technique was found to be of significantly lower efficiency as a crude oil demulsifier intermediate. This polyglycol ether polymerization product was compared to a like polyglycol ether product made under conditions where the reaction mixture was controlled at a temperature of about 320° F. throughout essentially all of the reaction. In the latter, the heat exchange fluid was water and was maintained under boiling conditions substantially as shown and described above in the preferred mode. The temperature of the reaction mixture was measured, and the vapor pressure of the water was controlled in respect thereto. The later polyglycol ether was an excellent demulsifier intermediate.

The nature and objects of the present invention having been completely described and illustrated and the best mode thereof set forth, what we wish to claim as new and useful and secure by Letters Patent is:

1. An apparatus for conducting exothermic reactions which comprises a reactor including a tube and shell heat exchanger and a reactor vessel connected in series, a boiler drum for supplying a boiling fluid as the heat exchange fluid to said reactor, means for connecting said boiler drum in indirect heat exchange with said reactor, means for changing the pressure in said boiler drum, and a temperature controller means responsive to the temperature of the reaction mixtur which is operatively connected to said means for changing the pressure in the boiler drum whereby the vapor pressure on the heat exchange fluid is controlled in response to the temperature of the reaction mixture.

2. An apparatus for conducting exothermic reactions which comprises a reactor, a boiler drum for supplying a boiling fluid as the heat exchange fluid to said reactor, the liquid level in said boiler drum being above said reactor, means for connecting said boiler drum in indirect heat exchange with said reactor, means for changing the pressure in said boiler drum, and a temperature controller means responsive to the temperature of the reaction mixture which is operatively connected to said means for changing the pressure in the boiler drum whereby the vapor pressure in the heat exchange fluid is controlled in response to the temperature of the reaction mixture.

3. An apparatus for conducting exothermic reactions which comprises a reactor consisting of a tube and shell heat exchanger and a reactor vessel connected in series, a boiler drum for supplying a boiling fluid as the heat exchange fluid to said reactor positioned so that the liquid level in said boiler drum is above said reactor, means for connecting said boiler drum in indirect heat exchange with said reactor, means for changing the pressure in said boiler drum, a temperature controller means having a temperature sensing device on the outlet side of said tube and shell heat exchanger for measuring the temperature of the reaction mixture and which is operatively connected to said means for changing the pressure in the boiler drum whereby the vapor pressure on the heat exchange fluid is controlled in response to the measured temperature of the reaction mixture, and means for introducing the reactants just prior to the introduction of the reaction mixture to said tube and shell heat exchanger.

References Cited by the Examiner

UNITED STATES PATENTS

| 1,894,768 | 1/1933 | Hechenbleikner | 23—288 |
| 2,355,938 | 8/1944 | Wroby | 23—288 X |

FOREIGN PATENTS

| 590,336 | 7/1947 | Great Britain. |

MORRIS O. WOLK, *Primary Examiner.*

JAMES H. TAYMAN, Jr., *Examiner.*